United States Patent
Hagiwara et al.

(10) Patent No.: US 11,796,006 B2
(45) Date of Patent: Oct. 24, 2023

(54) METHOD FOR MANUFACTURING HUB UNIT BEARING, SWAGING DEVICE, AND METHOD FOR MANUFACTURING VEHICLE

(71) Applicant: NSK Ltd., Tokyo (JP)

(72) Inventors: Nobuyuki Hagiwara, Fujisawa (JP); Reiji Hirasaki, Hanyu (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/622,498

(22) PCT Filed: Aug. 19, 2020

(86) PCT No.: PCT/JP2020/031244
§ 371 (c)(1),
(2) Date: Dec. 23, 2021

(87) PCT Pub. No.: WO2021/033710
PCT Pub. Date: Feb. 25, 2021

(65) Prior Publication Data
US 2022/0243772 A1    Aug. 4, 2022

(30) Foreign Application Priority Data
Aug. 20, 2019    (JP) .................................. 2019-15097

(51) Int. Cl.
*F16C 43/04*    (2006.01)
*B21K 1/40*    (2006.01)
(Continued)

(52) U.S. Cl.
CPC .............. *F16C 43/04* (2013.01); *F16C 19/18* (2013.01); *B21J 9/06* (2013.01); *B21K 1/40* (2013.01)

(58) Field of Classification Search
CPC ................ B21K 1/40; B60B 2310/208; B60B 2310/3142; B60B 2310/314; B21D 39/03;
(Continued)

(56) References Cited

U.S. PATENT DOCUMENTS

| 2004/0165804 A1* | 8/2004 | Toda | ...................... B60B 27/00 384/544 |
|---|---|---|---|
| 2010/0146790 A1 | 6/2010 | Gingrich | |

FOREIGN PATENT DOCUMENTS

| JP | 2000-211302 A | 8/2000 |
|---|---|---|
| JP | 2003-113848 A | 4/2003 |

(Continued)

OTHER PUBLICATIONS

Written Opinion of the International Searching Authority for International Application No. PCT/JP2020/031244 (Year: 2020).*

(Continued)

*Primary Examiner* — Christopher J Besler
(74) *Attorney, Agent, or Firm* — Sughrue Mion, PLLC

(57) ABSTRACT

To realize a method for manufacturing a hub unit bearing capable of increasing the processing efficiency of a staking portion. An axial inner end portion of a hub ring 22 is processed into a staking portion 26 by rotating a die 31 around a reference axis C in a state in which the die 31 having a rotation axis α inclined with respect to the reference axis C is pressed against the axial inner end portion of the hub ring 22 under a condition that the hub ring 22 is disposed so that a center axis of the hub ring 22 is coaxial or parallel to the reference axis C and the hub ring 22 is supported to be radially movable.

8 Claims, 10 Drawing Sheets

(51) Int. Cl.
*B21J 9/06* (2006.01)
*F16C 19/18* (2006.01)

(58) Field of Classification Search
CPC ......... F16C 43/086; F16C 43/04; B21J 9/025; B21J 9/06
See application file for complete search history.

(56) References Cited

FOREIGN PATENT DOCUMENTS

| | | | |
|---|---|---|---|
| JP | 2004-162913 A | 6/2004 |
| JP | 2005-257034 A | 9/2005 |
| JP | 2006-116550 A | 5/2006 |
| JP | 2012-045612 A | 3/2012 |
| JP | 5261023 B2 | 8/2013 |

OTHER PUBLICATIONS

International Search Report for PCT/JP2020/031244 dated Oct. 27, 2020 (PCT/ISA/210).
Extended European Search Report dated Apr. 19, 2022 in European Application No. 20855423.8.

* cited by examiner

METHOD FOR MANUFACTURING HUB UNIT BEARING, SWAGING DEVICE, AND METHOD FOR MANUFACTURING VEHICLE

CROSS REFERENCE TO RELATED APPLICATIONS

This application is a National Stage of International Application No. PCT/JP2020/031244 filed Aug. 19, 2020, claiming priority based on Japanese Patent Application No. 2019-150197 filed Aug. 20, 2019.

TECHNICAL FIELD

The present invention relates to a method for manufacturing a hub unit bearing rotatably supporting a vehicle wheel of a vehicle such as an automobile by a suspension device, a swaging device used to perform the manufacturing method, and a method for manufacturing a vehicle.

BACKGROUND ART

A vehicle wheel and a braking rotation body of an automobile are rotatably supported by a suspension device using a hub unit bearing. FIG. 8 shows an example of a conventionally known hub unit bearing. In a hub unit bearing 100, a hub 102 is rotatably supported on the inner radial side of an outer ring 101 through a plurality of rolling elements 103a and 103b.

Regarding the hub unit bearing 100, the axial outside is the left side in FIG. 8 which is the outside in the width direction of the vehicle body in a state in which the hub unit bearing 100 is assembled to the automobile and the axial inside is the right side in FIG. 8 which is the center side in the width direction of the vehicle body in a state in which the hub unit bearing 1 is assembled to the automobile.

The outer ring 101 includes a double row of outer ring tracks 104a and 104b which are formed on an inner peripheral surface and includes a stationary flange 105 which is formed at an axially center portion to support and fix the outer ring 101 by a knuckle of the suspension device. The hub 102 includes a double row of inner ring tracks 106a and 106b which are formed on an outer peripheral surface and includes a rotary flange 107 and a cylindrical pilot portion 108 which are formed at the axial outer portion to support and fix the vehicle wheel and the braking rotation body by the hub 102. At the axial outer portion of the hub 102, the rotary flange 107 protrudes radially outward and the pilot portion 108 extends axially outward from a portion adjacent to the radial inside of the rotary flange 107. A plurality of the rolling elements 103a and 103b are arranged for each row between the double row of outer ring tracks 104a and 104b and the double row of inner ring tracks 106a and 106b. With such a configuration, the hub 102 is rotatably supported on the inner radial side of the outer ring 101.

In the example shown in the drawing, the hub 102 is a combination of a hub ring 109 and an inner ring 110. The hub ring 109 includes the inner ring track 106a which is formed on the outer peripheral surface of the axially center portion and is formed on the axial outside in the double row of inner ring tracks 106a and 106b and includes the rotary flange 107 and the pilot portion 108 which are formed at the axial outer portion. Further, the hub ring 109 includes a fitting shaft portion 111 which is formed at the axial inner portion and has an outer diameter smaller than that of a portion adjacent to the axial outside. The inner ring 110 includes the inner ring track 106b which is formed on an outer peripheral surface and is located on the axial inside. Such an inner ring 110 is externally fitted by being press-inserted into the fitting shaft portion 111 while the axial outer end surface abuts against a step surface 112 existing at the axial outer end portion of the outer peripheral surface of the fitting shaft portion 111. In this state, the axial inner end surface of the inner ring 110 is suppressed by a staking portion 113 which is formed by plastically deforming a cylindrical portion, extending axially inward from the axial inner end portion of the fitting shaft portion 111, radially outward. Then, the axial inner end surface of the inner ring 110 is suppressed by the staking portion 113 in this way, so that an appropriate preload is applied to the rolling elements 103a and 103b.

As a device for forming the above-described staking portion 113, a swaging device 114 shown in FIG. 9 is known (for example, see Japanese Patent Application, Publication No. 2012-45612 (Patent Literature 1) and Japanese Patent No. 5261023 (Patent Literature 2)). The swaging device 114 includes a die 115 and a holder 116. The holder 116 functions as a receiver for receiving a load applied from the die 115 to the hub ring 109 and includes a flange receiving surface 117 which is provided on the upper surface and an insertion hole 118 which opens to the flange receiving surface 117.

When forming the staking portion 113, the pilot portion 108 of the hub ring 109 is inserted into the insertion hole 118 of the holder 116 without any radial rattling and the axial outer surface of the rotary flange 107 of the hub ring 109 is brought into contact with the flange receiving surface 117 of the holder 116. Accordingly, the hub ring 109 is supported by the holder 116 while the radial movement of the hub ring 109 is restricted.

Then, the die 115 is rotated around the center axis of the hub ring 109 while the die 115 having a rotation axis inclined with respect to the center axis of the hub ring 109 is pressed against the axial inner end portion (cylindrical portion) of the hub ring 109 in this state, so that the axial inner end portion of the hub ring 109 is processed into the staking portion 113. That is, a processing force that is directed downward in the up and down direction and outward in the radial direction is applied from the die 115 to a part of the circumferential direction of the axial inner end portion of the hub ring 109. Further, a position to which this processing force is applied is continuously changed in the circumferential direction of the axial inner end portion of the hub ring 109 in accordance with the rotation of the die 115 around the center axis of the hub ring 109. Accordingly, the staking portion 113 is formed by plastically deforming the axial inner end portion of the hub ring 109 radially outward.

CITATION LIST

Patent Literature

[Patent Literature 1]
Japanese Patent Application, Publication No. 2012-45612
[Patent Literature 1]
Japanese Patent No. 5261023

SUMMARY OF INVENTION

Technical Problem

Incidentally, when the staking portion 113 is formed as described above, the swaging device 114 generates energy for pressing the die 115 against the axial inner end portion of the hub ring 109 and energy for rotating the die 115 around the center axis (reference axis) of the hub ring 109. However, not all of these energies (input energy E1 in FIG. 10) are consumed as energy for forming the staking portion 113 (output energy E2 in FIG. 10). That is, a part of the input energy E1 is consumed as energy (loss energy E3 in FIG. 10) for deforming or vibrating a portion other than the axial inner end portion of the hub ring 109, for example, in a member constituting the swaging device 114 or a member constituting the hub unit bearing 100. Therefore, in order to increase the processing efficiency of the staking portion 113, that is, to increase the ratio (E2/E1) of the output energy E2 with respect to the input energy E1, it is desired to reduce the loss energy E3.

In contrast, in the above-described conventional method, the processing of the staking portion 113 is performed while the radial movement of the hub ring 109 is restricted by inserting the pilot portion 108 of the hub ring 109 into the insertion hole 118 of the holder 116 without any radial rattling. Therefore, there is a problem to be improved that vibration is likely to occur in the swaging device 114 during the processing and thus the loss energy E3 is likely to increase.

The present invention has been made in view of the above-described circumstances and an object is to realize a method for manufacturing a hub unit bearing, a swaging device, and a method for manufacturing a vehicle capable of increasing the processing efficiency of a staking portion.

Solution to Problem

A hub unit bearing to be manufactured in the present invention includes an outer ring having a double row of outer ring tracks on an inner peripheral surface, a hub having a double row of inner ring tracks on an outer peripheral surface, and a plurality of rolling elements arranged in each row between the double row of outer ring tracks and the double row of inner ring tracks. The hub includes an inner ring and a hub ring. The inner ring has an inner ring track formed on an outer peripheral surface and located on an axial inside in the double row of inner ring tracks. The hub ring includes a rotary flange protruding radially outward from an axial outer portion, a cylindrical pilot portion extending axially outward from a portion adjacent to a radial inside of the rotary flange, an inner ring track formed on an outer peripheral surface of a portion located on an axial inside in relation to the rotary flange directly or using other members and located on an axial outside in the double row of inner ring tracks, a fitting shaft portion located on an axial inside in relation to the inner ring track on the axial outside and having the inner ring externally fitted thereto, and a staking portion formed by plastically deforming an axial inner end portion located on an axial inside in relation to the fitting shaft portion and having a cylindrical shape radially outward and suppressing an axial inner end surface of the inner ring.

The method for manufacturing the hub unit bearing of the present invention includes a staking process of forming the axial inner end portion of the hub ring into the staking portion by rotating a die around a reference axis while rotating the die around a rotation axis in a state in which the die having the rotation axis inclined with respect to the reference axis is pressed against the axial inner end portion of the hub ring under a condition that the hub ring is disposed so that a center axis of the hub ring is coaxial or parallel to the reference axis and the hub ring is supported by a holder to be radially movable.

In a first aspect of the method for manufacturing the hub unit bearing of the present invention, the pilot portion is inserted into an insertion hole opening to a flange receiving surface of the holder, disposed coaxially with the reference axis, and having an inner diameter larger than an outer diameter of the pilot portion and an axial outer surface of the rotary flange is brought into contact with the flange receiving surface to dispose the hub ring so that the center axis of the hub ring is coaxial or parallel to the reference axis and to support the hub ring radially movably.

In the first aspect of the manufacturing method, for example, a diameter difference which is a difference between the inner diameter of the insertion hole and the outer diameter of the pilot portion is determined based on an energy sum which is a sum of total energy necessary to rotate the die around the reference axis and a total energy necessary to press the die against the axial inner end portion of the hub ring in the staking process.

In this case, for example, the diameter difference is determined in a range in which the energy sum is a predetermined value or less. Alternatively, for example, the diameter difference is determined in a range in which the energy sum is substantially constant. Alternatively, for example, the diameter difference is determined in a range in which a change amount of the energy sum with respect to a change amount of the diameter difference is a predetermined value or less.

In the first aspect of the manufacturing method, for example, the total energy necessary to rotate the die around the reference axis in the staking process is obtained by integrating a torque for rotating the die around the reference axis with a rotation angle of the die around the reference axis.

In the first aspect of the manufacturing method, for example, the total energy necessary to press the die against the axial inner end portion of the hub ring in the staking process is obtained by integrating a load for pressing the die and the axial inner end portion of the hub ring against each other in the direction of the reference axis with a relative movement amount in the direction of the reference axis between the holder and the die.

In the first aspect of the manufacturing method, for example, the staking process is started while the center axis of the hub ring is disposed coaxially with the reference axis.

In this case, for example, the pilot portion inserted into the insertion hole is internally fitted into a cylindrical alignment jig disposed coaxially with the reference axis so that the center axis of the hub ring is disposed coaxially with the reference axis and then the staking process is started in a state in which the alignment jig is axially retracted from the pilot portion while maintaining the coaxial arrangement of the center axis of the hub ring with respect to the reference axis.

In a second aspect of the method for manufacturing the hub unit bearing of the present invention, the pilot portion is inserted into an insertion hole opening to a flange receiving surface of the holder movable in a direction orthogonal to the reference axis and an axial outer surface of the rotary flange is brought into contact with the flange receiving surface to dispose the hub ring so that the center axis of the hub ring is coaxial or parallel to the reference axis and to support the hub ring radially movably.

In the second aspect of the manufacturing method, for example, the staking process is started while the center axis of the hub ring is disposed coaxially with the reference axis.

A first aspect of a swaging device of the present invention includes a reference axis, a holder, a die, and an alignment jig. The holder includes a flange receiving surface provided on one side surface in the direction of the reference axis and contacting an axial outer surface of the rotary flange and an insertion hole opening to the flange receiving surface, disposed coaxially with the reference axis, and having an inner diameter larger than an outer diameter of the pilot portion. The die is disposed on one side of the holder in the direction of the reference axis, has a rotation axis inclined with respect to the reference axis, and is provided to be rotatable around the reference axis and movable relative to the holder in the direction of the reference axis. The alignment jig is a cylindrical jig which is disposed coaxially with the reference axis on the inside of the insertion hole and the alignment jig is switched to a state in which the center axis of the hub ring is disposed coaxially with the reference axis by internally fitting the pilot portion inserted into the insertion hole and is switched to a state in which the hub ring is radially movable by the axial retraction from the pilot portion.

A second aspect of the swaging device of the present invention includes a reference axis, a holder, a die, and an alignment jig. The holder includes a flange receiving surface provided on one side surface in the direction of the reference axis and contacting an axial outer surface of the rotary flange and an insertion hole opening to the flange receiving surface and inserting the pilot portion thereinto and is supported to be movable in a direction orthogonal to the reference axis. The die is disposed on one side of the holder in the direction of the reference axis, has a rotation axis inclined with respect to the reference axis, and is provided to be rotatable around the reference axis and movable relative to the holder in the direction of the reference axis.

For example, the second aspect of the swaging device further includes: a support base which is prevented from moving in a direction orthogonal to the reference axis; a movable base; an X-direction linear guide which supports the movable base to be movable in an X direction corresponding to one direction orthogonal to the reference axis with respect to the support base; and a Y-direction linear guide which supports the holder to be movable in a Y direction orthogonal to each of the reference axis and the X direction with respect to the movable base.

For example, the second aspect of the swaging device further includes a spring which biases the holder in a direction in which the center axis of the insertion hole matches the reference axis when the holder moves so that the center axis of the insertion hole does not match the reference axis.

A vehicle to be manufactured in the present invention includes a hub unit bearing. A method for manufacturing the vehicle of the present invention manufactures the hub unit bearing by the method for manufacturing the hub unit bearing of the present invention.

Advantageous Effects of Invention

According to the present invention, it is possible to increase the processing efficiency of the staking portion.

Figure 4:
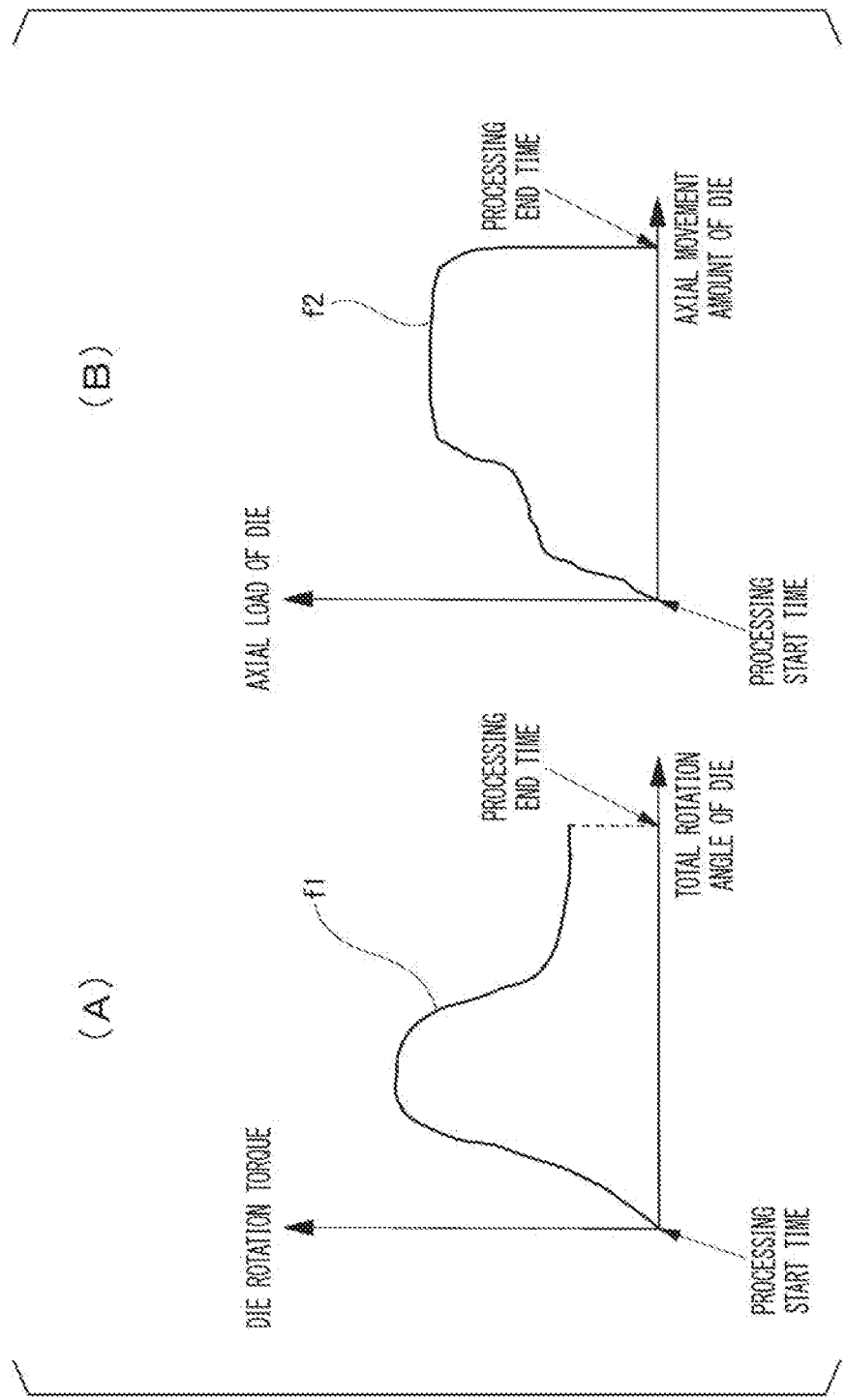

Part (A) of FIG. 4 is a diagram showing a relationship between a total die rotation angle and a die rotation torque in a staking process and part (B) of FIG. 4 is a diagram showing a relationship between a displacement amount in a die axis direction and a load in the die axis direction in the staking process.

Figure 5:
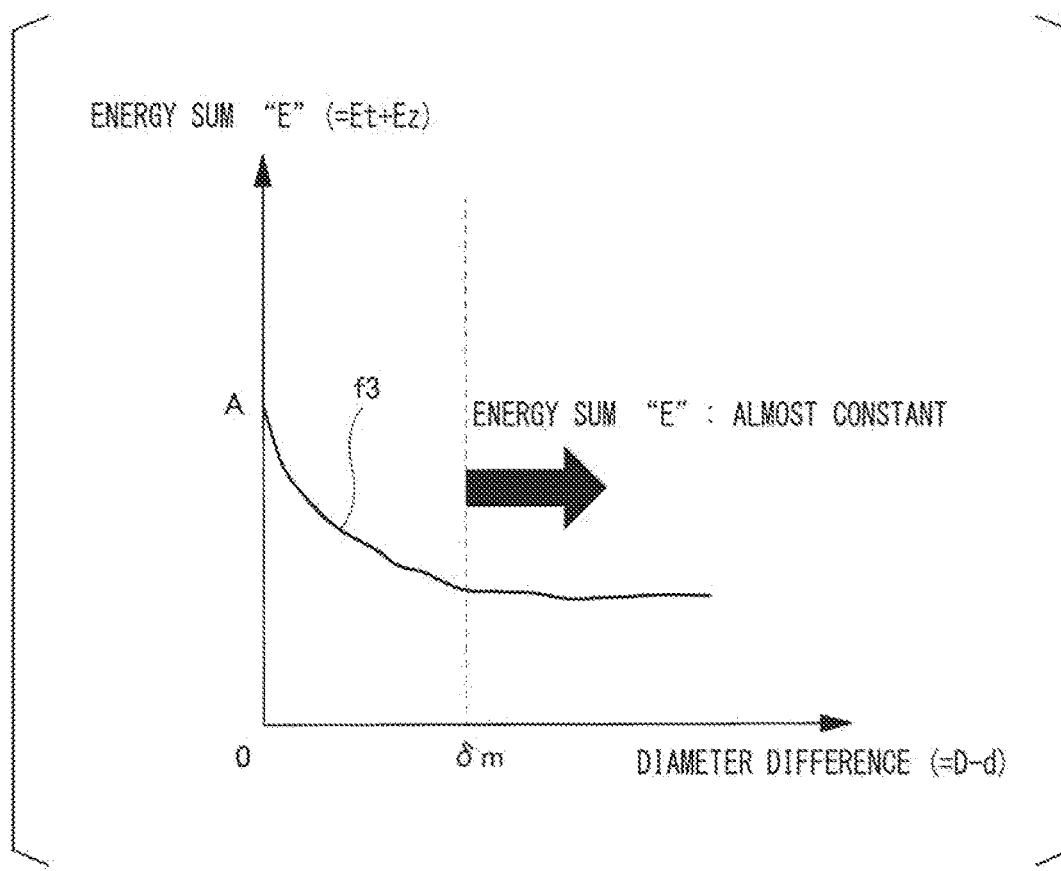

FIG. 5 is a diagram showing a relationship between a diameter difference which is a difference between an inner diameter of an insertion hole of a holder and an outer diameter of a pilot portion of a hub ring and the energy sum generated to perform the staking process.

Figure 6:
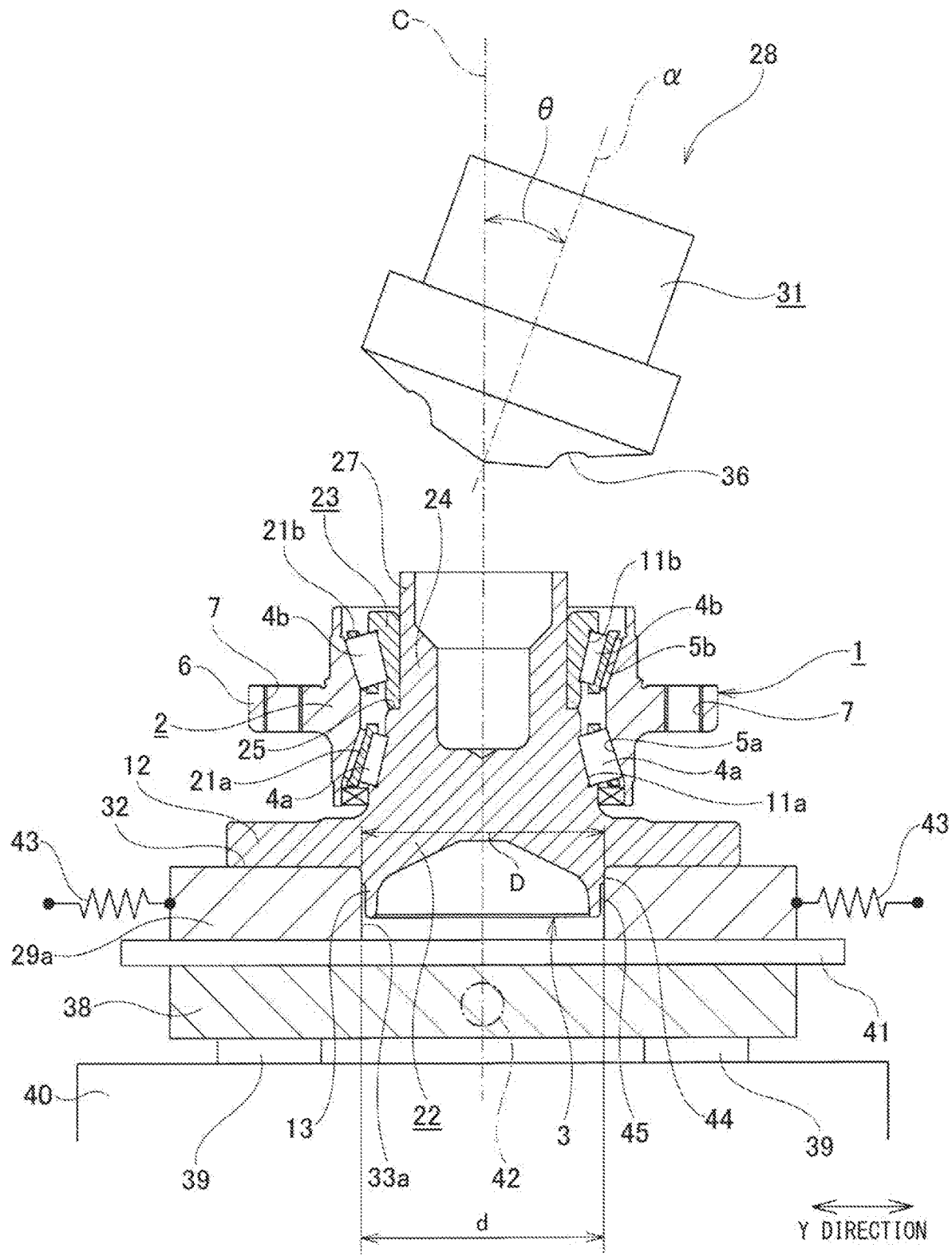

FIG. 6 is a cross-sectional view showing a state in which a hub unit bearing is set in a swaging device in a second example of the embodiment.

Figure 7:
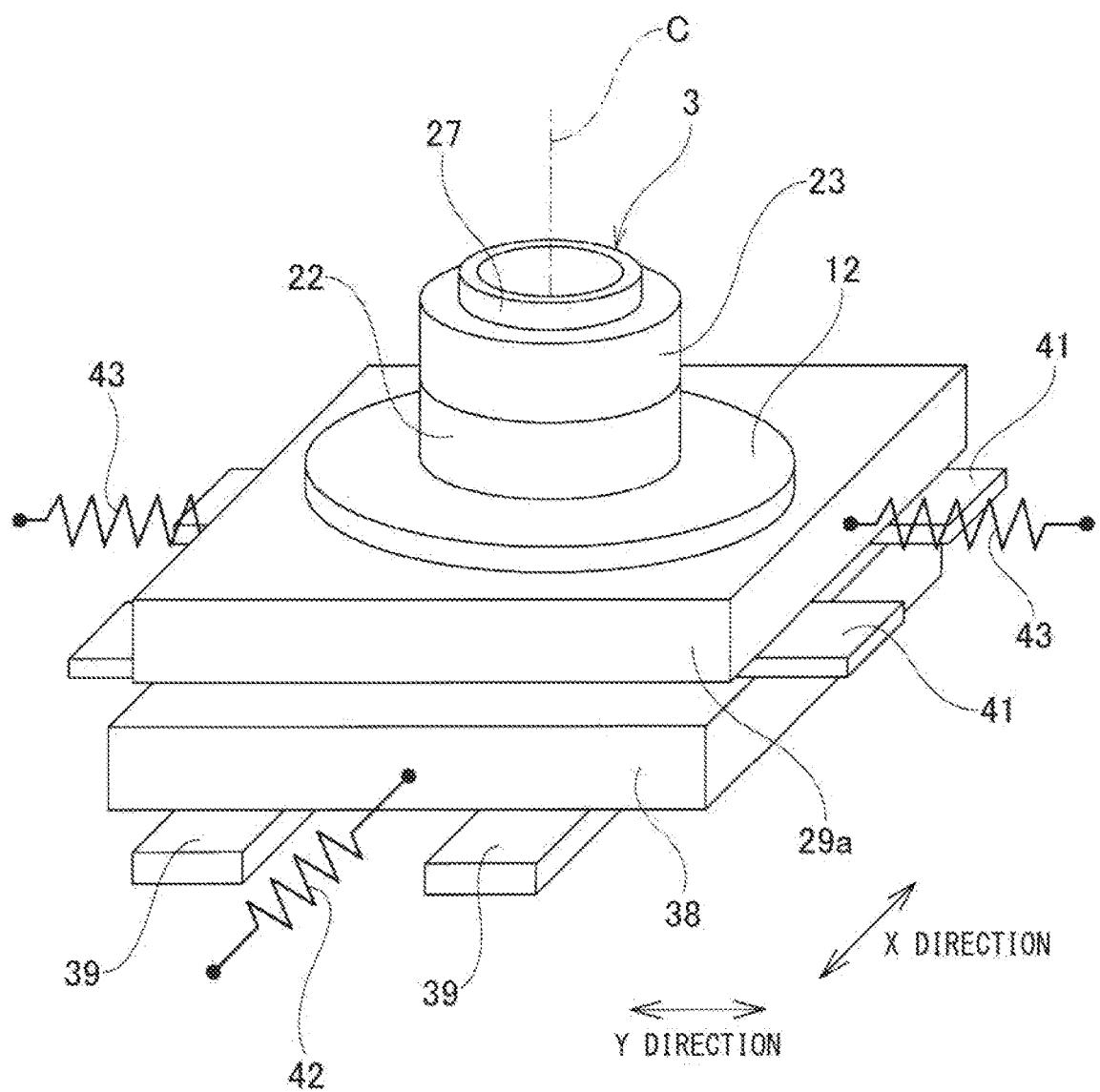

FIG. 7 is a perspective view schematically showing a support portion of the hub unit bearing constituting the swaging device and a part of the hub unit bearing in the second example of the embodiment.

Figure 8:
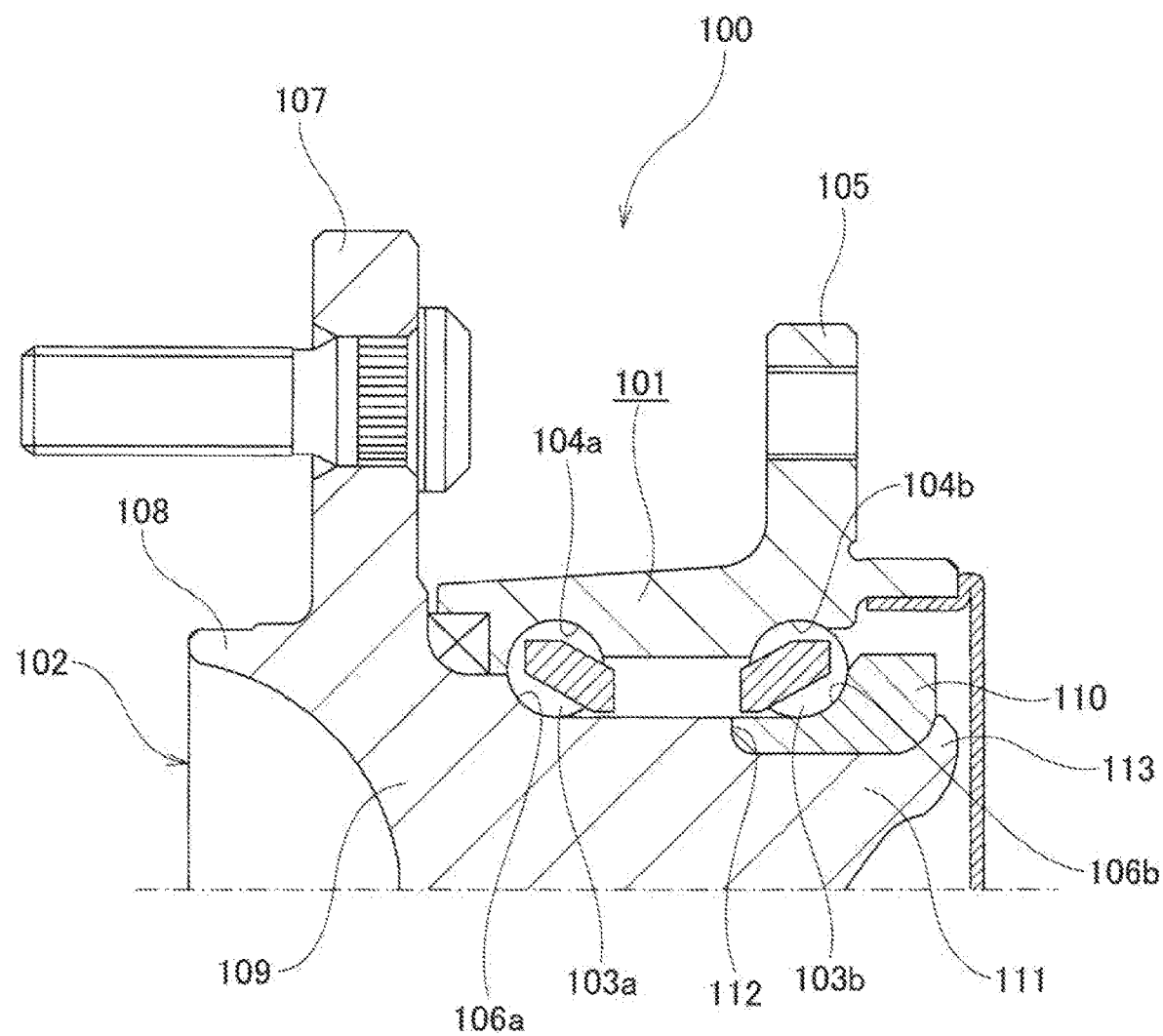

FIG. 8 is a half cross-sectional view showing an example of a conventionally known hub unit bearing.

Figure 9:
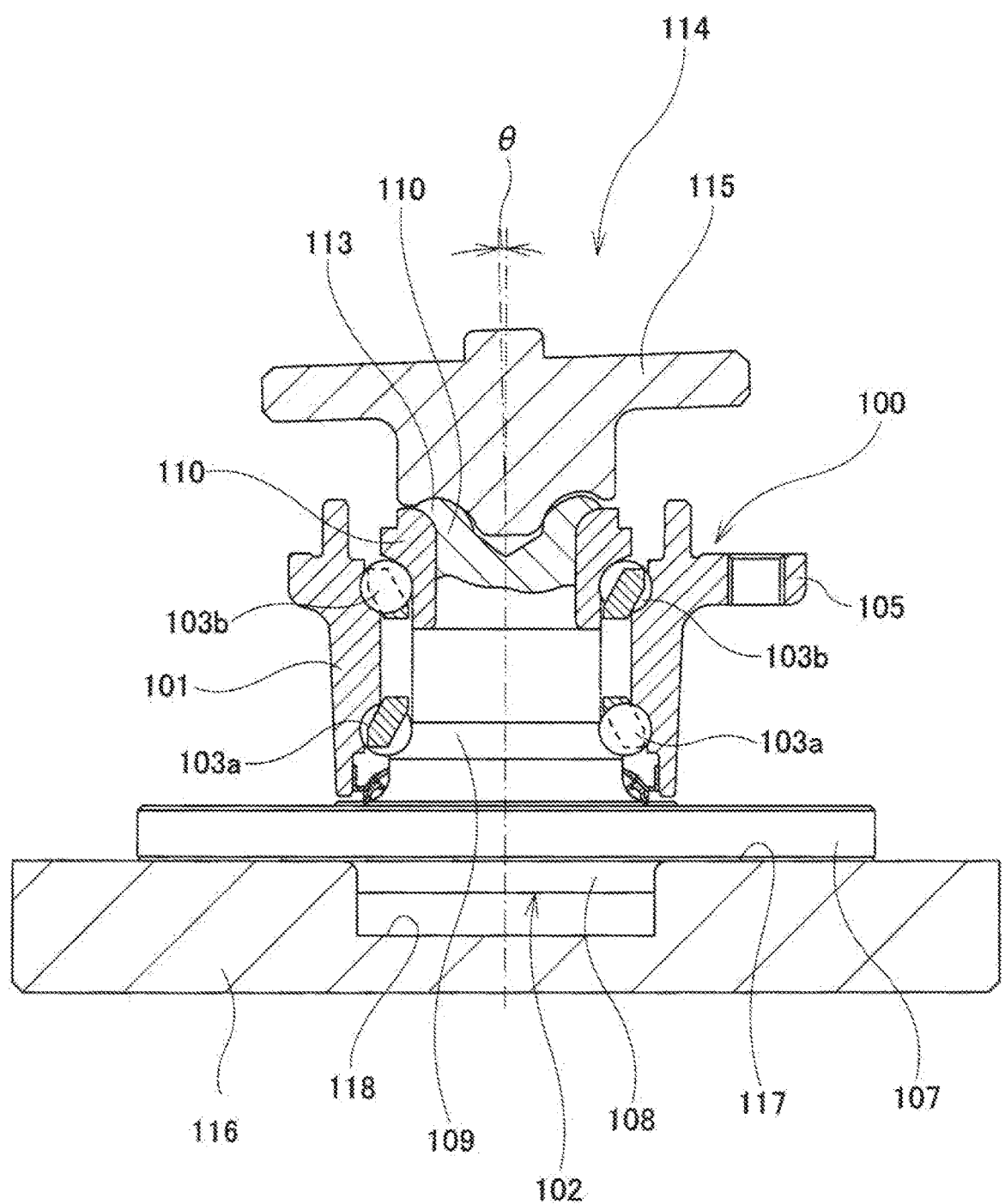

FIG. 9 is a cross-sectional view showing a conventionally known swaging device and a conventionally known hub unit bearing.

Figure 10:
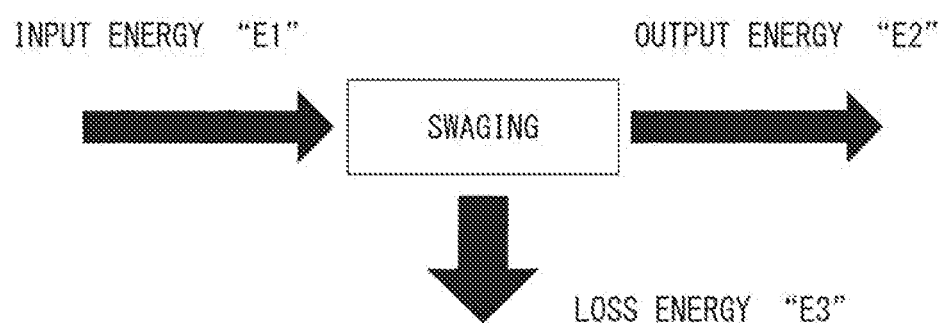

FIG. 10 is a diagram showing a relationship between input energy E1, output energy E2, and loss energy E3 when forming the staking portion of the hub unit bearing.

DESCRIPTION OF EMBODIMENT

First Example of Embodiment

A first example of an embodiment of the present invention will be described with reference to FIGS. 1 to 5.

(Overview of Example)

Figure 1:
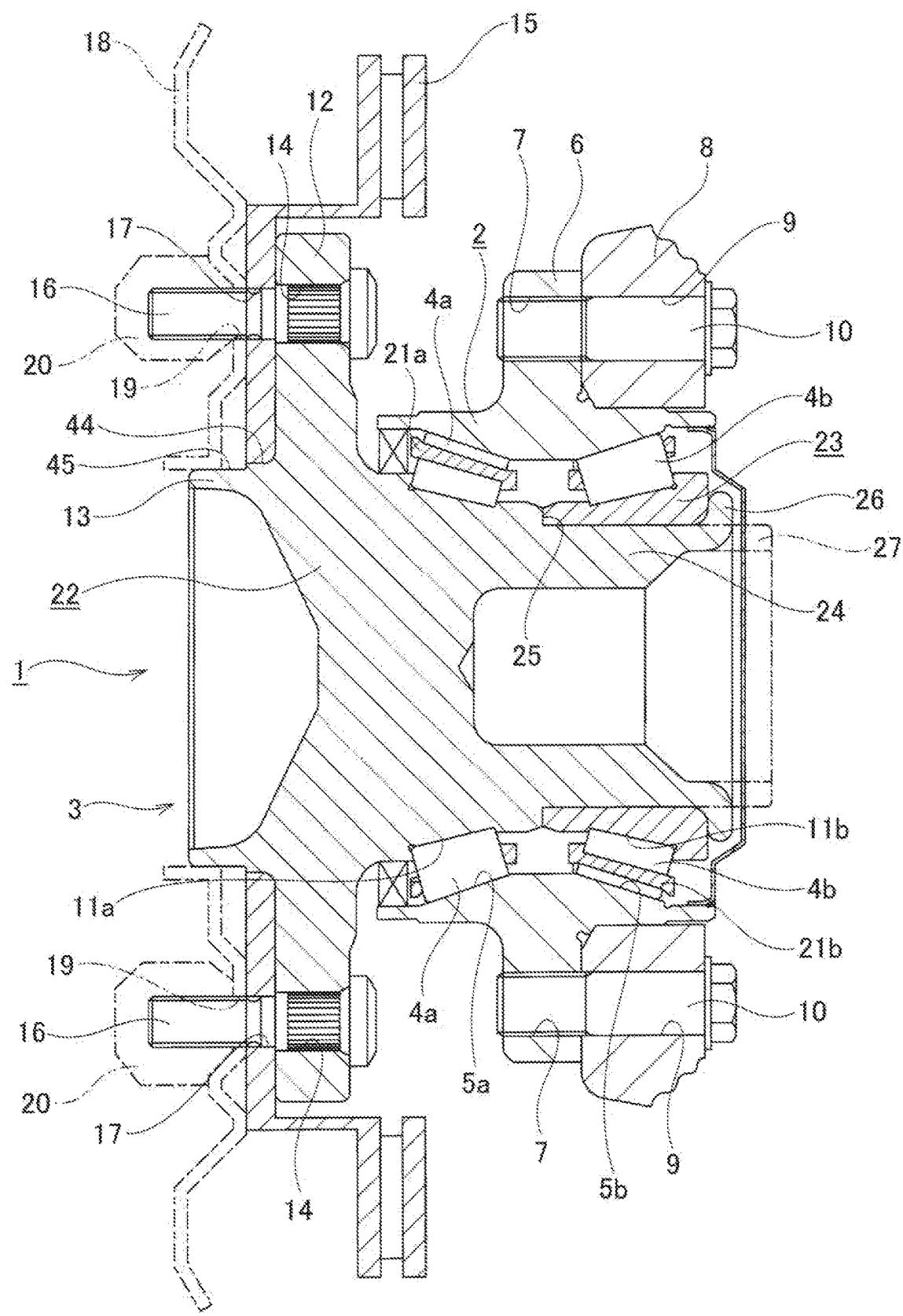
FIG. 1 is a cross-sectional view showing a state in which a hub unit bearing to be manufactured in a first example of the embodiment is assembled to a vehicle.
Figure 2:
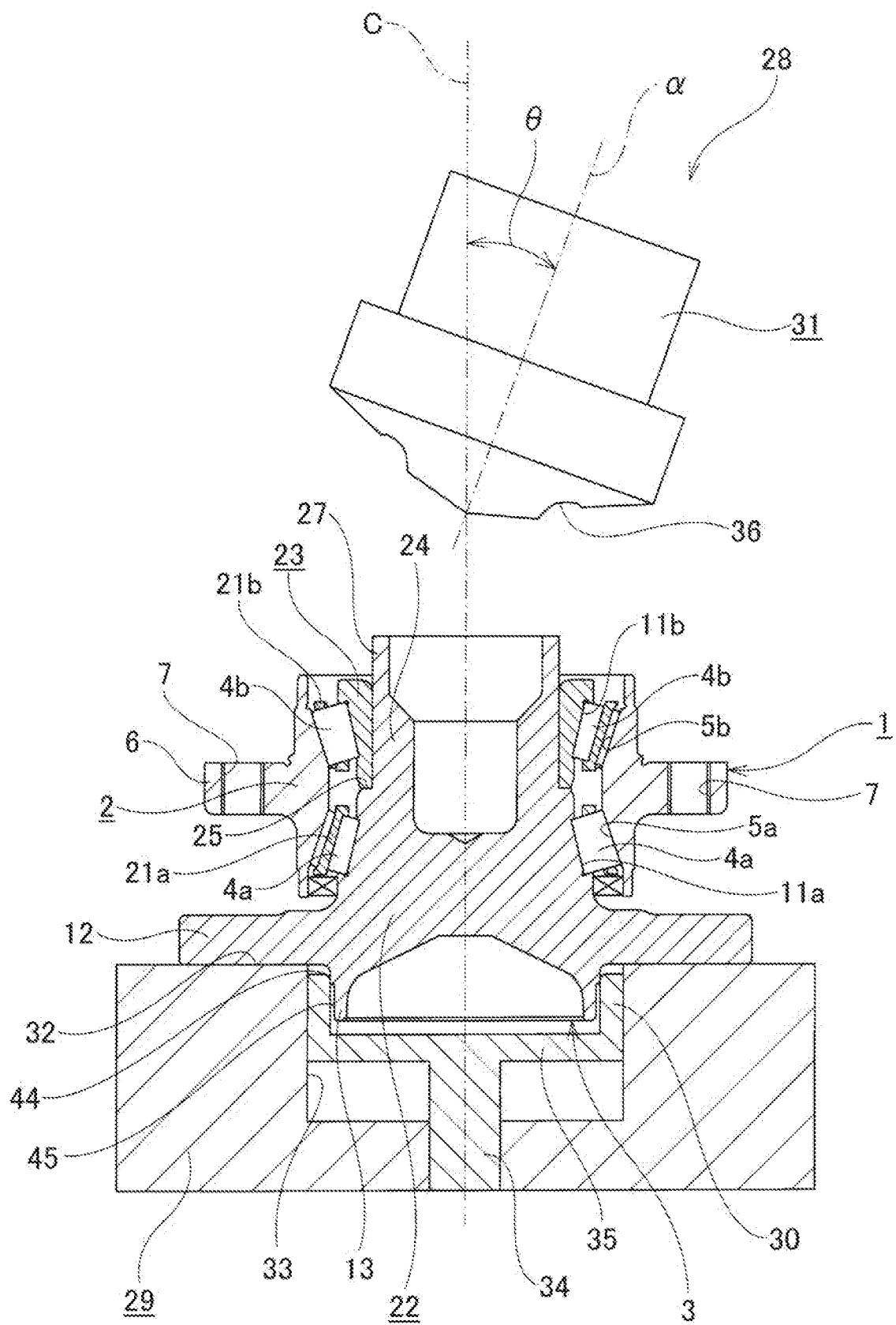
FIG. 2 is a cross-sectional view showing a state in which the hub unit bearing is set in a swaging device in the first example of the embodiment.
Figure 3:
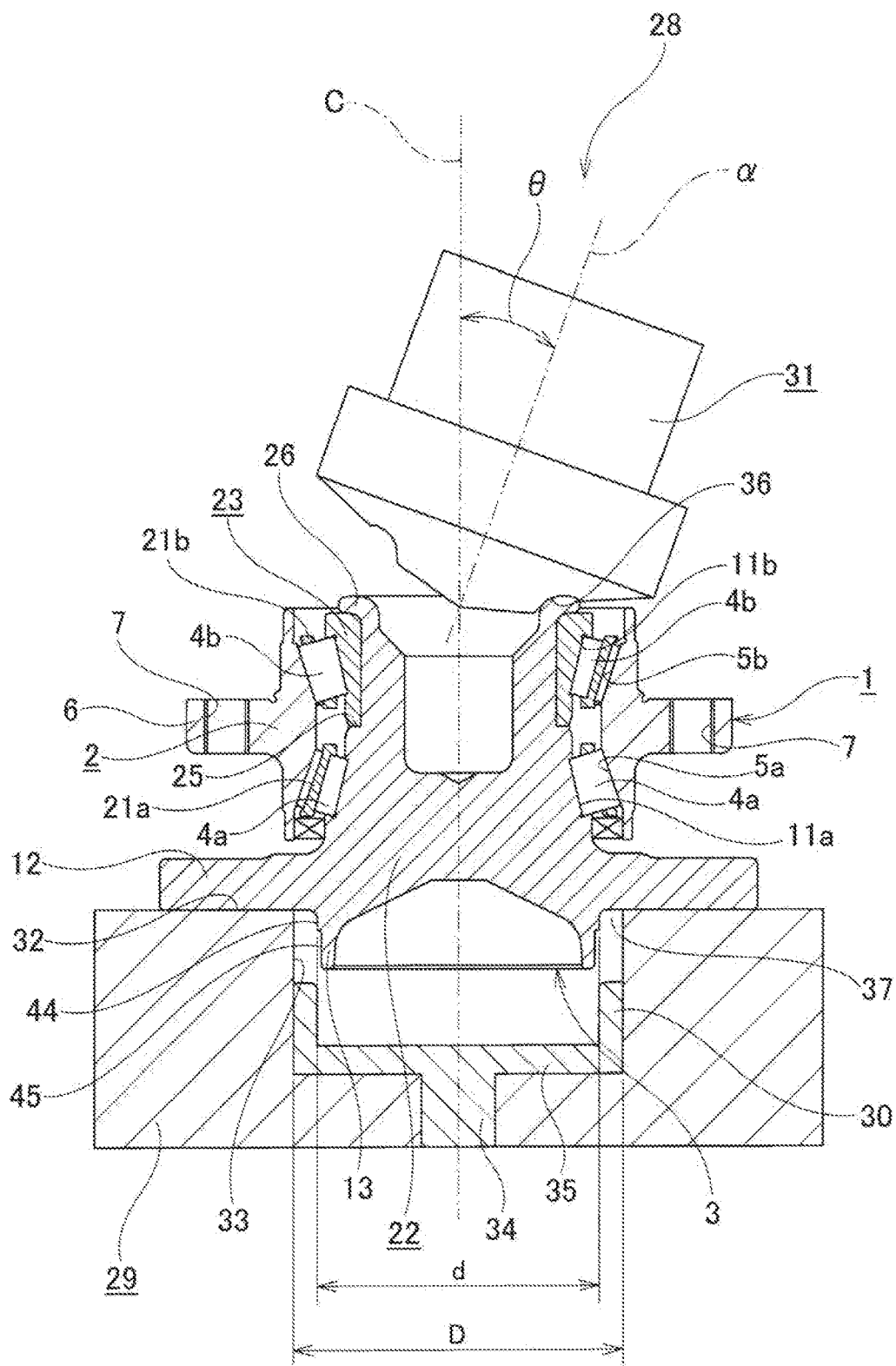
FIG. 3 is a cross-sectional view showing a situation in which a staking portion is formed by the swaging device in the first example of the embodiment.

In this example, a swaging device 28 shown in FIGS. 2 and 3 is used to form a staking portion 26 of a hub ring 22 constituting a hub unit bearing 1 shown in FIG. 1. Further, in order to increase the processing efficiency of the staking portion 26, as shown in FIG. 3, an inner diameter D of an insertion hole 33 of a holder 29 constituting the swaging device 28 is set to be larger than an outer diameter d of a pilot portion 13 of the hub ring 22 (D>d) and a radial gap 37 is provided between the inner peripheral surface of the insertion hole 33 of the holder 29 and the outer peripheral surface of the pilot portion 13 of the hub ring 22, so that the hub ring 22 is movable in the radial direction with respect to the holder 29 during the processing for forming the staking portion 26. However, the center axis of the hub ring 22 is disposed coaxially with the reference axis C which is the center axis of the insertion hole 33 at the time of starting the processing for forming the staking portion 26.

Hereinafter, a method for setting a diameter difference δ capable of sufficiently increasing the processing efficiency of the staking portion 26 (=difference D−d between the inner diameter D of the insertion hole 33 and the outer diameter d of the pilot portion 13) will be described after describing a configuration of the hub unit bearing 1 to be manufactured in this example, a configuration of the swaging device 28 for forming the staking portion 26, and a method for manufacturing the hub unit bearing 1.

(Configuration of Hub Unit Bearing 1)

FIG. 1 shows the hub unit bearing 1 to be manufactured in this example. The hub unit bearing 1 is for a driven wheel includes an outer ring 2, a hub 3, and a plurality of rolling elements 4a and 4b.

Regarding the hub unit bearing 1, the axial outside is the left side in FIG. 1 which is the outside in the width direction of the vehicle in a state in which the hub unit bearing is assembled to the vehicle and the axial inside is the right side in FIG. 1 which is the center side in the width direction of the vehicle in a state in which the hub unit bearing is assembled to the vehicle.

The outer ring 2 is made of a hard metal such as medium carbon steel and includes a double row of outer ring tracks 5a and 5b and a stationary flange 6. The double row of outer ring tracks 5a and 5b are formed on the inner peripheral surface of the axially center portion of the outer ring 2 and are partially conical concave surfaces that are inclined in a direction in which the diameter increases in a direction moving away from each other in the axial direction. The stationary flange 6 protrudes radially outward from the axially center portion of the outer ring 2 and includes a plurality of support holes 7 which are screw holes provided at a plurality of positions in the circumferential direction.

The outer ring 2 is supported and fixed to a knuckle 8 in such a manner that a bolt 10 inserted through a passage hole 9 of the knuckle 8 constituting a suspension device of the vehicle is screwed and tightened to a support hole 7 of the stationary flange 6 from the axial inside.

The hub 3 is disposed on the radial inside of the outer ring 2 coaxially with the outer ring 2 and includes a double row of inner ring tracks 11a and 11b, a rotary flange 12, and a pilot portion 13. The double row of inner ring tracks 11a and 11b are formed at a portion facing the double row of outer ring tracks 5a and 5b on the outer peripheral surface of the hub 3 and are partially conical convex surfaces that are inclined in a direction in which the diameter increases in a direction moving away from each other in the axial direction. The rotary flange 12 protrudes radially outward from the axial outer portion of the hub 3 located on the axial outside in relation to the outer ring 2 and includes a plurality of attachment holes 14 in the circumferential direction. The pilot portion 13 is a cylindrical portion which extends axially outward from a portion adjacent to the radial inside of the rotary flange 12 in the axial outer portion of the hub 3 located on the axial outside in relation to the outer ring 2. Further, the outer peripheral surface of the pilot portion 13 is a stepped cylindrical surface including a cylindrical large-diameter portion 44 which constitutes the axial inner portion and a cylindrical small-diameter portion 45 which constitutes the axial outer portion and has an outer diameter smaller than that of the large-diameter portion 44.

Further, in the example shown in the drawing, in order to connect and fix the braking rotation body 15 such as a disc or a drum to the rotary flange 12, a serration portion provided near a base end of a stud 16 is press-inserted into the attachment hole 14 and the intermediate portion of the stud 16 is press-inserted into a passage hole 17 of the braking rotation body 15 while the braking rotation body 15 is externally fitted to the axial inner portion (large-diameter portion 44) of the pilot portion 13. Further, in order to fix a wheel 18 constituting the vehicle wheel to the rotary flange 12, a male screw portion provided at the tip of the stud 16 is inserted into a passage hole 19 of the wheel 18 and a nut 20 is screwed into the male screw portion while the wheel 18 is externally fitted to the axial outer portion (small-diameter portion 45) of the pilot portion 13.

The rolling elements 4a and 4b are each made of hard metal such as bearing steel or ceramics and a plurality of the rolling elements are arranged for each row between the double row of outer ring tracks 5a and 5b and the double row of inner ring tracks 11a and 11b. Further, the rolling elements 4a and 4b are rotatably held by retainers 21a and 21b for each row. Additionally, in this example, each of the rolling elements 4a and 4b is a tapered roller.

In this example, the hub 3 is a combination of the hub ring 22 made of a hard metal such as medium carbon steel and an inner ring 23 made of a hard metal such as a bearing steel.

The hub ring 22 includes the inner ring track 11a which is formed on the outer peripheral surface of the axially center portion and is located on the axial outside in the double row of inner ring tracks 11a and 11b and includes the rotary flange 12 and the pilot portion 13 which are formed at the axial outer portion. Further, the hub ring 22 includes a fitting shaft portion 24 which is formed at the axial inner portion located on the axial inside in relation to the inner ring track 11a on the axial outside and has an outer diameter smaller than that of a portion adjacent to the axial outside. The inner ring 23 includes the inner ring track 11b which is formed on the outer peripheral surface and is located on the axial inside in the double row of inner ring tracks 11a and 11b. Such an inner ring 23 is externally fitted to the fitting shaft portion 24 by press-inserting while the axial outer end surface abuts against a step surface 25 existing at the axial outer end portion of the outer peripheral surface of the fitting shaft portion 24. In this state, the axial inner end surface of the inner ring 23 is suppressed by the staking portion 26 formed by plastically deforming a cylindrical portion 27, extending in the axial direction from the axial inner end portion of the fitting shaft portion 24, radially outward. Then, the axial inner end surface of the inner ring 23 is suppressed by the staking portion 26 in this way, so that an appropriate preload is applied to the rolling elements 4a and 4b.

(Configuration of Swaging Device 28)

Next, the swaging device 28 for forming the staking portion 26 will be described with reference to FIGS. 2 and 3. The swaging device 28 includes a vertical reference axis C, a holder 29, a die 31, and an alignment jig 30.

The holder 29 is a member that functions as a receiver for receiving a load applied from the die 31 to the hub ring 22 when forming the staking portion 26. The holder 29 includes a flange receiving surface 32 which is provided on the upper surface and an insertion hole 33 which opens to the flange receiving surface 32. The flange receiving surface 32 is a flat surface orthogonal to the reference axis C. The insertion hole 33 is a bottomed hole including a cylindrical inner peripheral surface disposed coaxially with the reference axis C. An inner diameter D of the insertion hole 33 is larger than an outer diameter d of the pilot portion 13 of the hub ring 22 (D>d). Here, the outer diameter d is the outer diameter of the large-diameter portion 44 of the pilot portion 13. Further, the axial depth of the insertion hole 33 is larger than the axial dimension of the pilot portion 13 of the hub ring 22. The holder 29 with such a configuration is supported by a support base (not shown) while the movement in a direction orthogonal to the reference axis C and the movement in the up and down direction along the reference axis C are restricted. However, in the case of implementing the present invention, the holder 29 can be supported to be movable in the up and down direction along the reference axis C and can generate a load for forming the staking portion 26 by the upward movement.

The die 31 is a tool for forming the staking portion 26 and is disposed above the holder 29. The die 31 has a rotation axis α inclined by an angle θ with respect to the reference axis C and includes a processing surface portion 36 which is an annular concave surface formed at the lower end portion and coaxially with the rotation axis α. The die 31 is formed to be movable in the up and down direction along the reference axis C and rotatable around the reference axis C and is rotatable around the rotation axis β. Additionally, in the case of implementing the present invention, when a load for forming the staking portion 26 is generated by the upward movement of the holder 29 as described above, the die 31 can be supported while the movement in the up and down direction along the reference axis C is restricted.

The alignment jig 30 is a jig for disposing the center axis of the hub ring 22 to be coaxially with the reference axis C before starting the formation of the staking portion 26. The alignment jig 30 is formed in a cylindrical shape, is disposed on the inside of the insertion hole 33 of the holder 29 coaxially with the reference axis C, and is movable in the up and down direction along the reference axis C. Therefore, in the example shown in the drawing, the alignment jig 30 is internally fitted into the insertion hole 33 without any rattling in the radial direction (horizontal direction) to be movable in the axial direction (up and down direction). Further, the lower end portion of the alignment jig 30 is connected to an upper end portion of an actuator rod 34 penetrating the center portion of the holder 29 in the up and down direction and movable in the up and down direction with respect to the holder 29 through a connection member 35. Additionally, in the example shown in the drawing, the alignment jig 30, the actuator rod 34, and the connection member 35 are integrated with each other, but may be separated from each other.

Further, the alignment jig 30 has an inner diameter in which the large-diameter portion 44 of the pilot portion 13 of the hub ring 22 can be internally fitted without any radial rattling. However, the alignment jig 30 can also have an inner diameter in which the small-diameter portion 45 of the pilot portion 13 of the hub ring 22 can be internally fitted without any radial rattling. Further, the axial distance between the upper end surface of the alignment jig 30 and the flange receiving surface 32 is larger than the axial dimension of the pilot portion 13 of the hub ring 22 in a state in which the alignment jig 30 is moved to a lower end position on the inside of the insertion hole 33.

(Method for Manufacturing Hub Unit Bearing 1)

Next, a method for forming the staking portion 26 using the swaging device 28 when manufacturing the hub unit bearing 1 will be described.

The work of forming the staking portion 26 is performed in a state in which the hub unit bearing 1 before the staking portion 26 is formed is assembled. Therefore, the hub unit bearing 1 before the staking portion 26 is formed is assembled in advance.

The hub unit bearing 1 before the staking portion 26 is formed can be assembled in an appropriate procedure, but can be assembled, for example, in the following procedure. First, the rolling elements 4a on the axial outer row are arranged around the inner ring track 11a on the axial outside in the hub ring 22 before the staking portion 26 is formed (the hub ring 22 having the cylindrical portion 27 formed at the axial inner end portion) while being held by the retainer 21a and the outer ring 2 on the axial outside is disposed around the axially center portion of the hub ring 22. Next, the rolling elements 4b on the axial inner row are arranged around the inner ring track 11b on the axial inside in the inner ring 23 while being held by the retainer 21b on the axial inside. Then, the inner ring 23 is externally fitted to the fitting shaft portion 24 of the hub ring 22 before the staking portion 26 is formed and the axial outer end surface of the inner ring 23 is brought into contact with the step surface 25.

When forming the staking portion 26 using the swaging device 28, first, the hub unit bearing 1 before the staking portion 26 is formed is set in the holder 29.

Specifically, as shown in FIG. 2, the die 31 is retracted upward and the alignment jig 30 is disposed on the upper portion inside the insertion hole 33 of the holder 29. Then, in this state, as shown in FIG. 2, the pilot portion 13 of the hub ring 22 is inserted into the insertion hole 33 of the holder 29. At the same time, the large-diameter portion 44 of the pilot portion 13 is internally fitted into the alignment jig 30 without any radial rattling. Accordingly, the center axis of the hub ring 22 is disposed coaxially with the reference axis C. Further, the axial outer surface of the rotary flange 12 of the hub ring 22 is brought into contact with the flange receiving surface 32 of the holder 29.

Next, as shown in FIGS. 2 and 3, the alignment jig 30 is retracted downward from the periphery of the pilot portion 13 while maintaining a state in which the center axis of the hub ring 22 is disposed coaxially with the reference axis C. Accordingly, the radial gap 37 exists along the entire circumference between the inner peripheral surface of the insertion hole 33 and the outer peripheral surface of the large-diameter portion 44 of the pilot portion 13.

That is, in this example, the hub ring 22 is kept in a stage of being disposed coaxially with the reference axis C at the time of starting the processing for forming the staking portion 26 described below. At the same time, the hub ring 22 is allowed to move in the radial direction with respect to the holder 29 based on the existence of the gap 37 during the processing for forming the staking portion 26 described below.

Next, the staking process is started in this state. That is, as shown in FIGS. 2 and 3, the die 31 is rotated around the reference axis C while the processing surface portion 36 of the die 31 is pressed against the cylindrical portion 27 of the hub ring 22 by moving the die 31 downward, so that the cylindrical portion 27 is processed into the staking portion 26. That is, a processing force that is directed downward in the up and down direction and outward in the radial direction is applied from the processing surface portion 36 of the die 31 to a part of the circumferential direction of the cylindrical portion 27. Further, a position to which this processing force is applied is continuously changed in the circumferential direction of the cylindrical portion 27 in accordance with the rotation of the die 31 around the reference axis C. Accordingly, the staking portion 26 is formed by plastically deforming the cylindrical portion 27 radially outward.

In the method for manufacturing the hub unit bearing 1 of this example described above, the hub ring 22 can move in the radial direction with respect to the holder 29 based on the existence of the gap 37 during the processing for forming the staking portion 26. Therefore, it is possible to reduce the deformation or vibration generated in the holder 29 constituting the swaging device 28 or a support base (not shown) supporting the holder 29 in accordance with the movement of the hub ring 22. That is, according to this example, it is possible to reduce the energy (loss energy E3 in FIG. 10) consumed other than the formation of the staking portion 26 and thus to increase the processing efficiency of the staking portion 26 (ratio (E2/E1) of output energy E2 with respect to input energy E1 in FIG. 10).

Further, in this example, the hub ring 22 is disposed coaxially with the reference axis C at the time of starting the processing for forming the staking portion 26. In other words, the variation in the radial position of the hub ring 22 at the time of starting the processing for forming the staking portion 26 is sufficiently suppressed. Therefore, it is possible to sufficiently suppress a variation in quality characteristic due to the formation of the staking portion 26 (for example, characteristics related to the axial force applied from the staking portion 26 to the inner ring 23 and the expansion amount of the inner ring 23 in accordance with the formation of the staking portion 26, etc.).

(Method for Setting Diameter Difference $\delta$)

Next, a method for setting a diameter difference $\delta$ (=D−d) (the size of the gap 37) capable of increasing the processing efficiency of the staking portion 26 will be described.

First, a plurality of holders 29 having different diameter differences $\delta$ (=D−d) in relation to the hub unit bearing 1 to be manufactured are prepared. Then, the cylindrical portion 27 of the hub ring 22 is processed into the staking portion 26 (the staking process is performed) using the swaging device 28 including the holder 29 for each of the prepared holders 29. Then, in the staking process, specifically, between the start of the processing for forming the staking portion 26 and the end of the processing, total energy Et necessary to rotate the die 31 around the reference axis C and total energy Ez necessary to press the die 31 against the axial inner end portion (cylindrical portion 27) of the hub ring 22 are obtained and an energy sum E (=Et+Ez) which is a sum of these energies is obtained.

In this example, in order to obtain the total energy Et necessary to rotate the die 31 around the reference axis C in the staking process, a "total die rotation angle" which is a total rotation angle of the die 31 and a "die rotation torque" which is a torque for rotating the die 31 around the reference axis C in the staking process are measured. Part (A) of FIG. 4 is a diagram (imaginary example) showing a relationship (curve f1) between the "total die rotation angle" and the "die rotation torque" measured in this way. Then, in this example, in the diagram, an area of a region sandwiched between the curve f1 and the horizontal axis (line indicating the "die rotation torque"=0) is obtained as the total energy Et. That is, the area (total energy Et) is obtained by integrating (numerically calculating) the "die rotation torque" with the "total die rotation angle". Additionally, the "total die rotation angle" can be measured by, for example, a rotary encoder or the like. Further, the "die rotation torque" can be measured, for example, based on a current value or the like of an electric motor for rotating the die 31 around the reference axis C.

Further, in this example, in order to obtain the total energy Ez necessary to press the die 31 against the axial inner end portion of the hub ring 22 in the staking process, the "movement amount in the die axis direction" which is the relative movement amount in the direction of the reference axis C between the holder 29 and the die 31 and the "load in the die axis direction" which is the load for pressing the axial inner end portions of the die 31 and the hub ring 22 in the direction of the reference axis C in the staking process are measured. Part (B) of FIG. 4 is a diagram (imaginary example) showing a relationship (curve f2) between the "movement amount in the die axis direction" and the "load in the die axis direction" measured in this way. Then, in this example, in the diagram, an area of a region sandwiched between the curve f2 and the horizontal axis (line indicating the "load in the die axis direction"=0) is obtained as the total energy Ez. That is, the area (total energy Ez) is obtained by integrating (numerically calculating) the "load in the die axis direction" with the "movement amount in the die axis direction". Additionally, the "movement amount in the die axis direction" can be measured, for example, by a linear scale or the like. Further, the "load in the die axis direction" can be measured, for example, based on a hydraulic pressure in a hydraulic mechanism for moving the die 31 in the axial direction.

Next, as described above, a relationship (curve f3) between the diameter difference $\delta$ (=D−d) and the energy sum E (=Et+Ez) shown in FIG. 5 is obtained by using the energy sum E (=Et+Ez) obtained for each of the holders 29 having different diameter differences $\delta$ (=D−d).

In the relationship, when the diameter difference $\delta$ (=D−d) is gradually increased from 0, the energy sum E (=Et+Ez) gradually decreases at the beginning, but becomes almost constant from the middle. In the range in which the energy sum E is almost constant, it is considered that the movement amount in the radial direction of the hub ring 22 during the staking process is almost constant regardless of the value of the diameter difference $\delta$ (=D−d). Additionally, even if the diameter difference $\delta$ (=D−d) is increased, the quality characteristics due to the formation of the staking portion 26 (for example, characteristics related to the axial force applied from the staking portion 26 to the inner ring 23 and the expansion amount of the inner ring 23 in accordance with the formation of the staking portion 26, etc.) do not deteriorate.

Incidentally, the energy (output energy E2 in FIG. 10) for forming the staking portion 26 is almost constant. Therefore, as described above, the fact that the energy sum E (=Et+Ez) (input energy E1 in FIG. 10) decreases in accordance with an increase in the diameter difference $\delta$ (=D−d) means that the energy (loss energy E3 in FIG. 10) consumed other than the formation of the staking portion 26 decreases, that is, the processing efficiency of the staking portion 26 increases.

Therefore, in order to increase the processing efficiency of the staking portion 26, the diameter difference $\delta$ (=D−d) may be set (determined) in the range in which the energy sum E (=Et+Ez) becomes a desired predetermined value or less by using the relationship of FIG. 5. In this case, the diameter difference $\delta$ (=D−d) may be preferably set in the range in which the energy sum E (=Et+Ez) is almost constant.

Additionally, a method for selecting a lower limit value $\delta m$ of the diameter difference $\delta$ (=D−d) in the range in which the energy sum E (=Et+Ez) is almost constant is arbitrary. For example, the lower limit value $\delta m$ can be set as the constant S when the curve represented by the formula (1) having the following constants A and S is fitted to the curve f3 showing the relationship of FIG. 5. $E = A \times \exp(-\delta/S)$ —(1) Here, in the formula (1), E is a variable indicating the energy sum E (=Et+Ez), $\delta$ is a variable indicating the diameter difference $\delta$ (=D−d), A is the value of the energy sum E (=Et+Ez) when the diameter difference $\delta$ (=D−d) is 0, and S is a constant considered as a time constant.

Alternatively, a value larger than the parameter S when the curve represented by the above formula (1) is fitted to the curve f3 representing the relationship of FIG. 5 (for example, the lower limit value in the range of the diameter difference $\delta$ (=D−d) in which the curve f3 in FIG. 5 appears almost constant) can be selected as the lower limit value $\delta m$.

From the experience of the present inventor, it has been confirmed that the horizontal vibration width of the support base of the holder is about 0.5 mm when the processing for forming the staking portion is performed by the above-described conventional method. Thus, in consideration of such circumstances, it is preferable that the lower limit value $\delta m$ is a value of 0.5 mm or more.

Alternatively, regarding the curve f3 showing a relationship of FIG. 5, the diameter difference $\delta$ (=D−d) can also be determined in a range in which the change amount (decrease amount) of the energy sum E (=Et+Ez) with respect to the change amount (increase amount) of the diameter difference δ (=D−d) becomes a predetermined value or less.

However, when the diameter difference δ (=D−d) is excessively increased, that is, the inner diameter of the insertion hole 33 of the holder 29 is excessively increased, there is a possibility that the rotary flange 12 may be easily deformed so as to fall inward in the axial direction during the processing for forming the staking portion 26. Therefore, in order to prevent such inconvenience, it is preferable that the diameter difference δ (=D−d) is 2 to 10 times or less of the lower limit value δm.

Additionally, in the example shown in FIGS. 2 and 3, processing is performed to form the staking portion 26 in a state before the stud 16 (see FIG. 1) is attached to the attachment hole 14 of the rotary flange 12. However, in the case of implementing the present invention, processing for forming the staking portion 26 can be performed with the stud 16 attached to the attachment hole 14 of the rotary flange 12. In this case, the shape of the holder is such that the stud 16 does not collide during the processing (for example, a shape having a stud insertion hole into which a portion of the stud 16 protruding outward in the axial direction from the axial outer surface of the rotary flange 12 can be loosely inserted).

Second Example of Embodiment

A second example of the embodiment of the present invention will be described with reference to FIGS. 6 and 7.

In this example, a holder 29*a* constituting a swaging device 28*a* and a peripheral structure thereof are different from the case of the first example of the embodiment. That is, in this example, the pilot portion 13 of the hub ring 22 can be inserted (internally fitted) into an insertion hole 33*a* of the holder 29*a* without any radial rattling.

Further, the holder 29*a* is supported to be movable in a direction orthogonal to the reference axis C. Therefore, the swaging device 28*a* of this example includes a support base 40, a movable base 38, an X-direction linear guide 39, and a Y-direction linear guide 41. Additionally, in this example, the reference axis C is the center axis of the insertion hole 33*a* formed in the holder 29*a* located at the neutral position before movement.

The support base 40 is disposed below the holder 29*a* and is prevented from moving in a direction orthogonal to the reference axis C. The movable base 38 is disposed between the holder 29*a* and the support base 40 in the up and down direction. Further, the movable base 38 is supported on the upper surface of the support base 40 through the X-direction linear guide 39. The X-direction linear guide 39 is a guide device which allows the movable base 38 to be movable in the X direction corresponding to one direction orthogonal to the reference axis C with respect to the support base 40. Further, the holder 29*a* is supported on the upper surface of the movable base 38 through the Y-direction linear guide 41. The Y-direction linear guide 41 is a guide device which allows the holder 29*a* to be movable in the Y direction corresponding to a direction orthogonal to the reference axis C and the X direction with respect to the movable base 38. Thus, the holder 29*a* is allowed to move in all directions orthogonal to the reference axis C with respect to the support base 40 by the X-direction linear guide 39 and the Y-direction linear guide 41.

Further, the center axis of the insertion hole 33*a* of the holder 29*a* matches the reference axis C while the movable base 38 is disposed at the neutral position of the X direction and the holder 29*a* is disposed at the neutral position of the Y direction.

Further, an X-direction spring 42 which imparts elasticity in the direction of returning the movable base 38 to the neutral position of the X direction when the movable base 38 moves in the X direction from the neutral position of the X direction is assembled between the movable base 38 and a fixed portion (not shown). Further, a Y-direction spring 43 which imparts elasticity in the direction of returning the holder 29*a* to the neutral position of the Y direction when the holder 29*a* moves in the Y direction from the neutral position of the Y direction is assembled between the holder 29*a* and a fixed portion (not shown). Thus, the movable base 38 is disposed at the neutral position of the X direction and the holder 29*a* is disposed at the neutral position of the Y direction in a state in which no external force is applied to the movable base 38 in the X direction and no external force is applied to the holder 29*a* in the Y direction (for example, a state before processing for forming the staking portion 26 (see FIG. 1) to be described later starts). As a result, the center axis of the insertion hole 33*a* of the holder 29*a* matches the reference axis C. That is, the X-direction spring 42 and the Y-direction spring 43 have a function of biasing the holder 29*a* in a direction in which the center axis of the insertion hole 33*a* matches the reference axis C when the holder 29*a* moves so that the center axis of the insertion hole 33*a* does not match the reference axis C.

Further, in this example, when the staking portion 26 is formed by using the swaging device 28*a* as described later, the elasticity of the X-direction spring 42 and the Y-direction spring 43 is sufficiently smaller than the radially outward processing force applied from the die 31 to the hub ring 22 (for example, 1/10 or less of the processing force).

When forming the staking portion 26 using the swaging device 28*a*, first, as shown in FIG. 6, the pilot portion 13 of the hub ring 22 is inserted into the insertion hole 33*a* of the holder 29*a* without any radial rattling so that the center axis of the hub ring 22 is disposed coaxially with the reference axis C. At the same time, the axial outer surface of the rotary flange 12 of the hub ring 22 is brought into contact with the flange receiving surface 32 of the holder 29*a*. Then, in this state, similarly to the first example of the embodiment, the cylindrical portion 27 is processed into the staking portion 26 by using the die 31.

In the method for manufacturing the hub unit bearing 1 of the above-described example, the hub ring 22 can move radially with respect to the reference axis C based on the presence of the X-direction linear guide 39 and the Y-direction linear guide 41 during the processing for forming the staking portion 26. Then, since the hub ring 22 radially moves with respect to the reference axis C during the processing for forming the staking portion 26 in this way, deformation and vibration of the holder 29*a* constituting the swaging device 28*a* and the support base 40 supporting the holder 29*a* can be reduced. Further, in this example, the elastic deformation amount of the X-direction spring 42 and the Y-direction spring 43 changes as the hub ring 22 radially moves with respect to the reference axis C, but since the elasticity of the X-direction spring 42 and the Y-direction spring 43 is sufficiently small, energy for changing the elastic deformation amount of the X-direction spring 42 and the Y-direction spring 43 is sufficiently suppressed. Thus, in this example, the energy (loss energy E3 of FIG. 10) consumed other than the formation of the staking portion 26 can be reduced and hence the processing efficiency of the staking portion 26 (ratio (E2/E1) of the output energy E2 with respect to the input energy E1 of FIG. 10) can be increased.

Further, in this example, the hub ring 22 is disposed coaxially with the reference axis C at the time of starting the processing for forming the staking portion 26. In other words, the variation in the radial position of the hub ring 22 at the time of starting the processing for forming the staking portion 26 is sufficiently suppressed. Therefore, it is possible to sufficiently suppress a variation in quality characteristic due to the formation of the staking portion 26 (for example, characteristics related to the axial force applied from the staking portion 26 to the inner ring 23 and the expansion amount of the inner ring 23 in accordance with the formation of the staking portion 26, etc.). Other configurations and effects are the same as in the first example of the embodiment.

Additionally, the present invention is not limited to the hub unit bearing for the driven wheel, and the hub unit bearing for a drive wheel can also be manufactured. Further, the present invention is not limited to the hub unit bearing using the tapered roller as the rolling element, and the hub unit bearing using a ball as the rolling element can also be manufactured. Further, the present invention is not limited to the hub unit bearing in which the inner ring track on the axial outside is directly formed on the outer peripheral surface of the axially center portion of the hub ring, and the hub unit bearing in which the inner ring track on the axial outside is formed on the outer peripheral surface of the second inner ring which is a separate member externally fitted in the axial intermediate portion of the hub ring can also be manufactured.

REFERENCE SIGNS LIST

1 Hub unit bearing
2 Outer ring
3 Hub
4a, 4b Rolling element
5a, 5b Outer ring track
6 Stationary flange
7 Support hole
8 Knuckle
9 Passage hole
10 Bolt
11a, 11b Inner ring track
12 Rotary flange
13 Pilot portion
14 Attachment hole
15 Braking rotation body
16 Stud
17 Passage hole
18 Wheel
19 Passage hole
20 Nut
21a, 21b Retainer
22 Hub ring
23 Inner ring
24 Fitting shaft portion
25 Step surface
26 Staking portion
27 Cylindrical portion
28, 28a Swaging device
29, 29a Holder
30 Alignment jig
31 Stamp
32 Flange receiving surface
33, 33a Insertion hole
34 Actuator rod
35 Connection member
36 Processing surface portion
37 Gap
38 Movable base
39 X-direction linear guide
40 Support base
41 Y-direction linear guide
42 X-direction spring
43 Y-direction spring
44 Large-diameter portion
45 Small-diameter portion
100 Hub unit bearing
101 Outer ring
102 Hub
103a, 103b Rolling element
104a, 104b Outer ring track
105 Stationary flange
106a, 106b Inner ring track
107 Rotary flange
108 Pilot portion
109 Hub ring
110 Inner ring
111 Fitting shaft portion
112 Step surface
113 Staking portion
114 Swaging device
115 Stamp
116 Holder
117 Flange receiving surface
118 Insertion hole

The invention claimed is:

1. A method for manufacturing a hub unit bearing, the hub unit bearing including an outer ring, a hub, and a rolling element disposed between the outer ring and the hub, the hub including a first hub element, a second hub element, and a staking portion connecting the first hub element and the second hub element to each other, the manufacturing method comprising the steps of:
preparing a holder;
holding the second hub element, which is combined with the first hub element along a reference axis, on the holder, and
forming the staking portion by using a die in a state in which (i) the second hub element is movable with respect to the holder in a direction orthogonal to the reference axis, wherein
the second hub element includes a shaft portion provided with a track for the rolling element and a pilot portion provided at a shaft end portion of the shaft portion,
the holder includes an insertion hole having an inner diameter larger than an outer diameter of the pilot portion of the second hub element,
the step of holding the second hub element includes:
holding the second hub element, which is combined with the first hub element along the reference axis, on the holder in a state in which the pilot portion of the second hub element is inserted into the insertion hole of the holder;
aligning a center axis of the second hub element to the reference axis with fitting an alignment jig to the pilot portion of the second hub element; and
removing the alignment jig from the aligned second hub element, and
the step of forming the staking portion includes forming the staking portion by using the die in a state in which the second hub element from which the alignment jig is removed is movable with respect to the holder in the direction orthogonal to the reference axis.

2. The method according to claim 1,
wherein the step of forming the staking portion is started in a state in which a center axis of the second hub element is disposed coaxially with the reference axis.

3. The method according to claim 1,
wherein a diameter difference which is a difference between the inner diameter of the insertion hole and the outer diameter of the pilot portion is determined based on an energy sum which is a sum of total energy necessary to rotate the die around the reference axis and a total energy necessary to press the die against the second hub element in the step of forming the staking portion.

4. The method according to claim 3,
wherein the diameter difference is determined in a range in which the energy sum is a predetermined value or less.

5. The method according to claim 3,
wherein the diameter difference is determined in a range in which the energy sum is substantially constant.

6. The method according to claim 3,
wherein the diameter difference is determined in a range in which a change amount of the energy sum with respect to a change amount of the diameter difference is a predetermined value or less.

7. The method according to claim 3,
wherein the total energy necessary to rotate the die around the reference axis in the step of forming the staking portion is obtained by integrating a torque for rotating the die around the reference axis with a rotation angle of the die around the reference axis.

8. The method according to claim 3,
wherein the total energy necessary to press the die against the second hub element in the step of forming the staking portion is obtained by integrating a load for pressing the die and the second hub element against each other in the direction of the reference axis with a relative movement amount in the direction of the reference axis between the holder and the die.

\* \* \* \* \*